United States Patent
Wang et al.

(10) Patent No.: US 10,834,645 B2
(45) Date of Patent: Nov. 10, 2020

(54) ACTIVE COORDINATION SET FOR MOBILITY MANAGEMENT

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 42 days.

(21) Appl. No.: 16/206,579

(22) Filed: Nov. 30, 2018

(65) Prior Publication Data

US 2020/0178131 A1   Jun. 4, 2020

(51) Int. Cl.
| | |
|---|---|
| *H04W 36/00* | (2009.01) |
| *H04W 8/08* | (2009.01) |
| *H04W 36/18* | (2009.01) |
| *H04W 36/30* | (2009.01) |
| *H04B 17/382* | (2015.01) |

(52) U.S. Cl.
CPC .... *H04W 36/00835* (2018.08); *H04B 17/382* (2015.01); *H04W 8/08* (2013.01); *H04W 36/0069* (2018.08); *H04W 36/0085* (2018.08); *H04W 36/18* (2013.01); *H04W 36/30* (2013.01)

(58) Field of Classification Search
CPC ....... H04W 36/00835; H04W 36/0069; H04W 36/0085; H04W 36/08; H04W 36/18; H04W 36/30; H04B 17/382
USPC ........................................................ 370/331
See application file for complete search history.

(56) References Cited

U.S. PATENT DOCUMENTS

| | | | |
|---|---|---|---|
| 6,038,448 A | 3/2000 | Chheda et al. | |
| 8,023,463 B2* | 9/2011 | Dick | H04L 1/16 370/331 |
| 8,315,629 B2 | 11/2012 | Pamp et al. | |

(Continued)

FOREIGN PATENT DOCUMENTS

| | | |
|---|---|---|
| CN | 107872889 | 4/2018 |
| EP | 2809104 | 12/2014 |

(Continued)

OTHER PUBLICATIONS

"Universal Mobile Telecommunications System (UMTS); Automatic Neighbor Relation (ANR) for UTRAN", 3GPP TS 25.484 version 10.0.1 Release 10, Jan. 2012, 21 pages.

(Continued)

*Primary Examiner* — Ricky Q Ngo
*Assistant Examiner* — Ellen A Kirillova
(74) *Attorney, Agent, or Firm* — Colby Nipper PLLC

(57) ABSTRACT

This document describes methods, devices, systems, and means for an active coordination set for mobility management. A user equipment (110) evaluates a link quality measurement for one or more base stations (120) and determines to include at least a first base station of the base stations (120) in an Active Coordination Set (ACS). The user equipment (110) sends a message, including an indication to add the at least first base station (120) to the ACS, to an ACS Server (520) that causes the ACS Server (520) to store the ACS for the user equipment (110) and send a copy of the stored ACS to a master base station (121). The user equipment (110) communicates via one or more of the base stations (120) included in the ACS. The user equipment (110) can transmit an uplink ACS sounding signal to evaluate base stations (120) to include in the ACS.

20 Claims, 10 Drawing Sheets

(56) References Cited

U.S. PATENT DOCUMENTS

| | | | |
|---|---|---|---|
| 8,483,184 | B2 | 7/2013 | Yokoyama et al. |
| 8,665,806 | B2 | 3/2014 | Wang et al. |
| 8,706,156 | B2 | 4/2014 | Han et al. |
| 9,008,678 | B2 | 4/2015 | Schoenerstedt |
| 9,100,095 | B2 | 8/2015 | Mantri |
| 9,374,772 | B2 | 6/2016 | Daoud |
| 9,380,533 | B2 | 6/2016 | Chung et al. |
| 9,674,863 | B2 | 6/2017 | Cheng et al. |
| 9,743,329 | B2 | 8/2017 | Xiao et al. |
| 2006/0203731 | A1* | 9/2006 | Tiedemann, Jr. ....... H04L 47/10 370/235 |
| 2010/0142462 | A1 | 6/2010 | Wang et al. |
| 2010/0210246 | A1* | 8/2010 | Yang .................. H04W 24/02 455/412.1 |
| 2011/0080893 | A1* | 4/2011 | Fong ................ H04W 36/0055 370/331 |
| 2012/0178462 | A1 | 7/2012 | Kim |
| 2012/0218968 | A1 | 8/2012 | Kim et al. |
| 2013/0053045 | A1 | 2/2013 | Chuang |
| 2013/0053079 | A1 | 2/2013 | Kwun et al. |
| 2013/0242787 | A1 | 9/2013 | Sun et al. |
| 2015/0326282 | A1 | 11/2015 | Futaki |
| 2017/0164252 | A1 | 6/2017 | Chaudhuri et al. |
| 2018/0152951 | A1 | 5/2018 | Zhuang et al. |
| 2018/0213450 | A1 | 7/2018 | Futaki et al. |
| 2018/0220403 | A1 | 8/2018 | Wilson et al. |
| 2019/0028348 | A1 | 1/2019 | Chai |
| 2019/0082331 | A1 | 3/2019 | Raghavan et al. |
| 2019/0165843 | A1 | 5/2019 | Wu et al. |
| 2019/0253106 | A1 | 8/2019 | Raghavan et al. |
| 2020/0187281 | A1 | 6/2020 | Wang et al. |

FOREIGN PATENT DOCUMENTS

| | | |
|---|---|---|
| WO | 2012114151 | 8/2012 |
| WO | 2017117340 | 7/2017 |
| WO | 2018073485 | 4/2018 |
| WO | 2019038700 | 2/2019 |
| WO | 2020117558 | 6/2020 |
| WO | 2020142532 | 7/2020 |
| WO | 2020159773 | 8/2020 |

OTHER PUBLICATIONS

Gorcin, et al., "Hybrid Automatic Neighbor Relations for 5G Wireless Networks", 2017, 6 pages.

"Universal Mobile Telecommunications System (UMTS); Automatic Neighbour Relation (ANR) for UTRAN", 3GPP TS 25.484 version 11.0.0 Release 11, Jan. 2012, 22 pages.

Zhang, et al., "PoC of SCMA-Based Uplink Grant-Free Transmission in UCNC for 5G", IEEE Journal on Selected Areas in Communications, vol. 35, No. 6, Jun. 2017, 10 pages.

"Beam Management and Beam Reporting", 3GPP TSG RAN WG1 Meeting #88bis, R1-1704488, Spokane, Washington, USA Apr. 3-7, 2017, Apr. 2017, 7 pages.

"Discussion on HARQ Management and HARQ-ACK Feedback", 3GPP TSG RAN WG1 Meeting #91, R1- 1720203, Reno, USA, Nov. 27-Dec. 1, 2017, Dec. 2017, 5 pages.

"International Search Report and Written Opinion", PCT Application No. PCT/US2019/063240, dated Feb. 13, 2020, 16 pages.

"International Search Report and Written Opinion", PCT Application No. PCT/US2019/063081, dated Feb. 21, 2020, 14 pages.

"International Search Report and Written Opinion", PCT Application No. PCT/US2019/069129, dated Mar. 31, 2020, 13 pages.

"International Search Report and Written Opinion", PCT Application No. PCT/US2020/014638, dated May 13, 2020, 12 pages.

"Invitation to Pay Additional Fees", PCT Application No. PCT/US2019/051980, dated Jun. 4, 2020, 10 pages.

"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0 (Oct. 2018), Oct. 2018, 366 pages.

"On the Need for More Flexible Configurations Related to CSI Reporting", 3GPP TSG RAN WG1 Meeting #87, R1-1611237, Reno, USA, Nov. 14-18, 2016, Nov. 2016, 6 pages.

"5G; Study on New Radio (NR) Access Technology", ETSI TR 138 912; V14.0.0; Technical Report; 3GPP TR 38.912 version 14.0.0 Release 14, May 2017, 77 pages.

"International Search Report and Written Opiniion", Application No. PCT/US2019/051980, dated Jul. 27, 2020, 19 pages.

"Non-Final Office Action", U.S. Appl. No. 16/210,969, dated Jul. 23, 2020, 15 Pages.

* cited by examiner

ACTIVE COORDINATION SET FOR MOBILITY MANAGEMENT

BACKGROUND

The evolution of wireless communication to fifth generation (5G) and sixth generation (6G) standards and technologies provides higher data rates and greater capacity, with improved reliability and lower latency, which enhances mobile broadband services. 5G and 6G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G and 6G systems. The 5G and 6G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase data rates, throughput, and reliability for a user equipment, various forms of wireless connectivity that use multiple radio links between base stations and the user equipment are supported in 5G and 6G systems. Techniques such as dual connectivity or coordinated multipoint communications, often coupled with beamformed signals, can improve data rates, throughput, and reliability, especially as received signal strengths decrease for the user equipment near the edge of cells. The use of these radio link configurations increases the complexity of mobility management to maintain high data rates and reliability for the user equipment.

Conventional mobility management techniques are based on base station neighbor relationships and use handovers to maintain connectivity for the user equipment. However, conventional handover techniques based on base station neighbor relationships disconnect radio bearers and establish new bearers during a handover, which can interrupt data communication for the user equipment during the handover thus affecting data throughput and latency for the user equipment.

SUMMARY

This summary is provided to introduce simplified concepts of an active coordination set for mobility management. The simplified concepts are further described below in the Detailed Description. This summary is not intended to identify essential features of the claimed subject matter, nor is it intended for use in determining the scope of the claimed subject matter.

In some aspects, a method for determining an Active Coordination Set (ACS) by a user equipment (UE) for wireless communication between the user equipment and one or more base stations is described in which the user equipment evaluates a link quality measurement for each of the one or more base stations and determines to include at least a first base station of the one or more base stations in the ACS. The user equipment sends a message to an ACS Server, including an indication to add the at least the first base station to the ACS, which causes the ACS Server to store the ACS, that includes the indication of the at least the first base station, for the user equipment, and send a copy of the stored ACS to a master base station. The user equipment communicates via one or more of the base stations included in the ACS.

In another aspect, a user equipment (UE) includes one or more radio frequency (RF) transceivers and a processor and memory system to implement an active coordination set (ACS) manager application that evaluates a link quality measurement for one or more base stations and determines to include at least a first base station of the one or more base stations in an ACS. The ACS manager application sends, using the one or more RF transceivers, a message, including an indication to add the at least the first base station, to an ACS Server that causes the ACS Server to store the ACS associated with the user equipment, and send a copy of the stored ACS to a master base station. The ACS manager application stores the ACS that includes the added at least the first base station and configures the user equipment to communicate, using the one or more RF transceivers, via one or more of the base stations included in the ACS.

In a further aspect, an Active Coordination Set (ACS) Server device comprises a network interface, one or more processors, and memory comprising instructions executable by the one or more processors to configure the ACS Server device to receive, using the network interface and via a master base station, an ACS-Modify message from a user equipment (UE). The ACS Server device is configured to retrieve a stored copy of the ACS associated with the UE from the memory, modify the retrieved copy of the ACS based on the received ACS-Modify message, and store the modified copy of the ACS in the memory. The ACS Server device is configured to send, using the network interface, a copy of the modified ACS to the master base station that is effective to cause the master base station to allocate air interface resources for communication between the user equipment and the base stations in the ACS as well as schedule joint communications for the user equipment and the base stations in the ACS.

BRIEF DESCRIPTION OF THE DRAWINGS

Aspects of an active coordination set for mobility management are described with reference to the following drawings. The same numbers are used throughout the drawings to reference like features and components.

DETAILED DESCRIPTION

Figure 1:
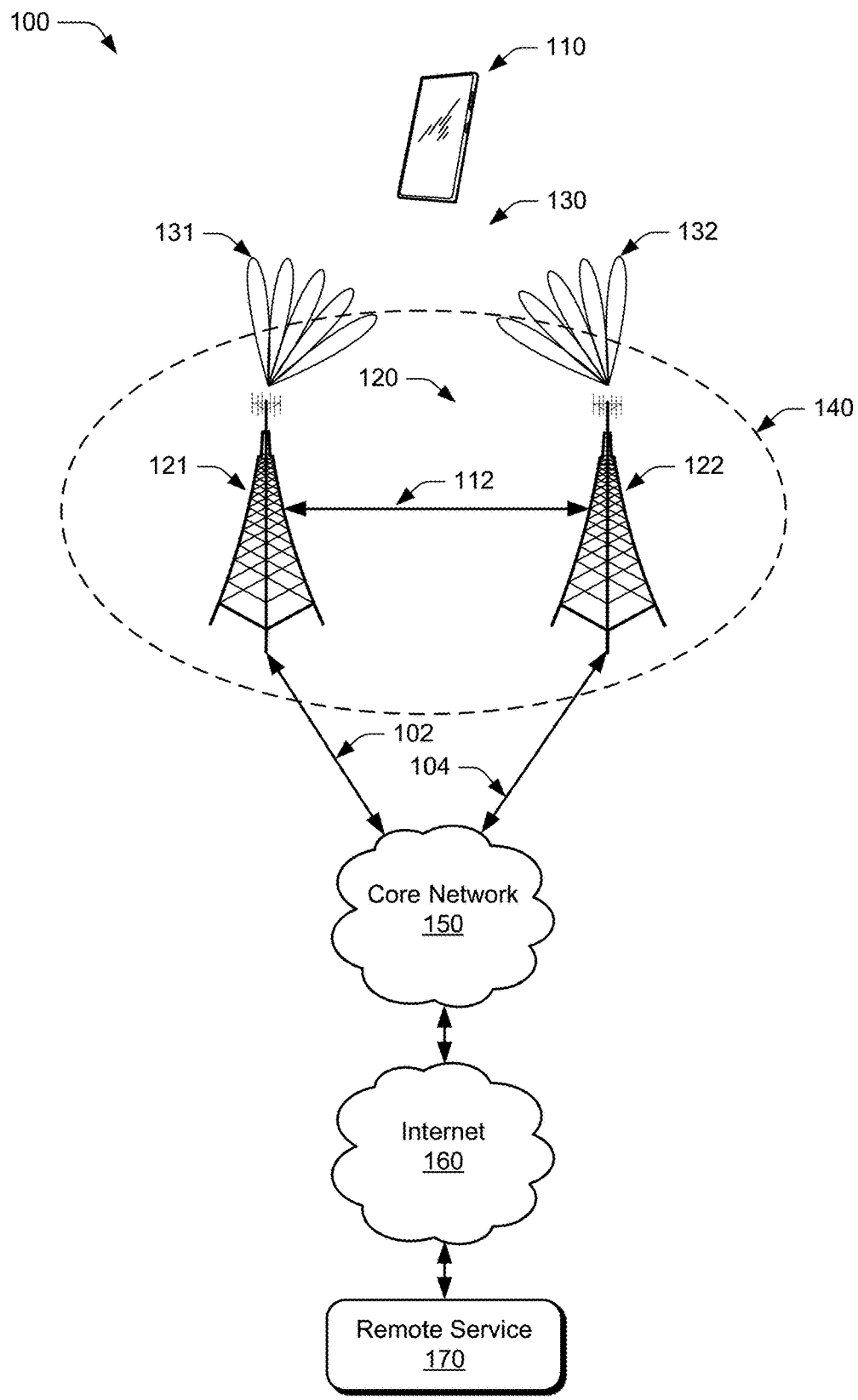
FIG. 1 illustrates an example wireless network system in which various aspects of an active coordination set for mobility management can be implemented.

This document describes methods, devices, systems, and means for an active coordination set for mobility management. A user equipment (UE) evaluates a link quality measurement for one or more base stations and determines to include at least a first base station of the base stations in an Active Coordination Set (AC S). The user equipment sends a message, including an indication to add the at least the first base station to the ACS, to an ACS Server that causes the ACS Server to store the ACS associated with the user equipment and send a copy of the stored ACS to a master base station. The user equipment communicates via one or more of the base stations included in the ACS. The user equipment can transmit an uplink ACS sounding signal to evaluate base stations to include in the ACS.

The evolution of wireless communication systems to fifth generation (5G) New Radio (5G NR) and Sixth Generation (6G) technologies provides higher data rates to users. By employing techniques, such as Coordinated MultiPoint (CoMP) or Dual Connectivity (DC) over beamformed wireless connections, higher data rates can be provided at the edges of 5G and 6G cells. However, the management of user equipment (UE) mobility and handovers becomes increasingly complex in these environments.

Conventional techniques, such as neighbor relation tables, are used to describe neighbor cells of a serving cell that may be potential target base stations to receive the user equipment in a handover. These techniques are base-station-specific, do not fully account for the changing radio-channel environment of a user equipment, and interrupt data communication for the user equipment during the handover. In aspects, the Active Coordination Set combines the selection of base stations of a mobile-assisted handover with beamforming. Each time an ACS is updated the selection of base stations and beamforming weights are updated in the ACS associated with the user equipment.

In aspects, an Active Coordination Set (ACS) is a user equipment-specific set of 5G and/or 6G base stations that are determined by the user equipment to be usable for wireless communication. More specifically, the base stations in the ACS are usable for joint transmission and/or reception (joint communication) between the user equipment and one or more of the base stations in the ACS. The joint transmission and/or reception techniques includes CoMP, Single Radio Access Technology (RAT) Dual Connectivity (single-RAT DC), and/or Multi-Radio Access Technology Dual Connectivity (MR-DC). Joint communication includes communication between the user equipment and multiple base stations, or communication between the user equipment and multiple sectors of a single base station. The joint communication includes communication in a single radio frequency band or communication in multiple radio frequency bands.

The user equipment determines which base stations to include in the ACS and updates the ACS as the base stations that provide usable link quality change. The user equipment also determines beamforming parameters for the base stations included in the ACS, such as beamforming weights, codebook indices, and the like. The user equipment communicates the ACS and changes to the ACS to an ACS Server that maintains ACSs for UEs in a wireless network. The UE communicates with the ACS using Radio Resource Control messaging, Non-Access Stratum messaging, or application layer messaging.

The ACS is provided to a master base station that coordinates joint transmission and/or reception for the user equipment. The master base station uses the ACS to schedule air interface resources for the set of base stations communicating with the user equipment. By using this joint scheduling for communications with the UE, scheduling efficiency is increased, and inter-cell interference (ICI) is reduced in the wireless network.

As channel conditions change for the user equipment, the user equipment can add or remove base stations from the ACS while concurrently communicating with base stations in the ACS that provide usable link quality. Based on these changes to the ACS, the master base station can add or remove base stations from the joint communication with the user equipment without performing a handover that interrupts data communication with the user equipment. By using the ACS for communication management, the master base station can select optimal routing for data communication with the UE and maintain the highest data throughput for the user equipment without interruptions caused by a handover.

While features and concepts of the described systems and methods for an active coordination set for mobility management can be implemented in any number of different environments, systems, devices, and/or various configurations, aspects of an active coordination set for mobility management are described in the context of the following example devices, systems, and configurations.

Example Environment

FIG. 1 illustrates an example environment 100 in which various aspects of an active coordination set for mobility management can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, a 6G node B, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or a similar 6G interface) for control-plane signaling and via an NG3 interface (or a similar 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

Example Devices

Figure 2:
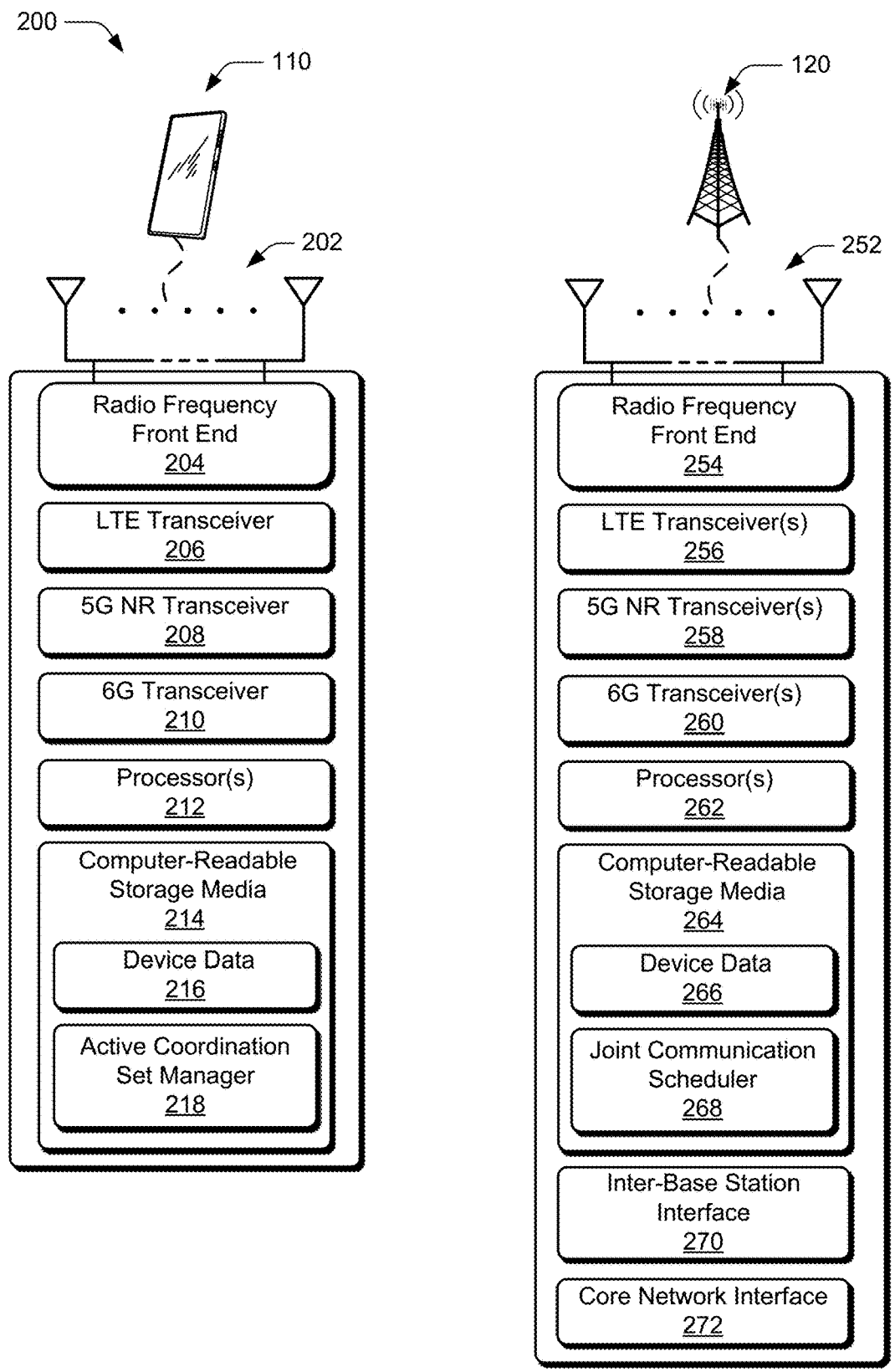
FIG. 2 illustrates an example device diagram that can implement various aspects of an active coordination set for mobility management.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include an active coordination set (ACS) manager 218. The ACS manager 218 can communicate with the antennas 202, the RF front end 204, the LTE transceiver 206, the 5G NR transceiver 208, and/or the 6G transceiver 210 to monitor the quality of the wireless communication links 130. Based on this monitoring, the ACS manager 218 can determine to add or remove base stations 120 from the ACS and/or trigger the transmission of an uplink ACS sounding signal.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a joint communication scheduler 268. Alternately or additionally, the joint communication scheduler 268 may be implemented in whole or part as hardware logic or circuitry integrated with or separate from other components of the base stations 120. In at least some aspects, the joint communication scheduler 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the joint communication scheduler 268 may allocate air interface resources and schedule communications for the UE 110 and base stations 120 in the ACS when the base station 120 is acting as a master base station for the base stations 120 in the ACS.

The base stations 120 include an inter-base station interface 270, such as an Xn and/or X2 interface, which the joint communication scheduler 268 configures to exchange user-plane and control-plane data between other base stations 120, to manage the communication of the base stations 120 with the user equipment 110. The base stations 120 include a core network interface 272 that the joint communication scheduler 268 configures to exchange user-plane and control-plane data with core network functions and/or entities.

Figure 3:
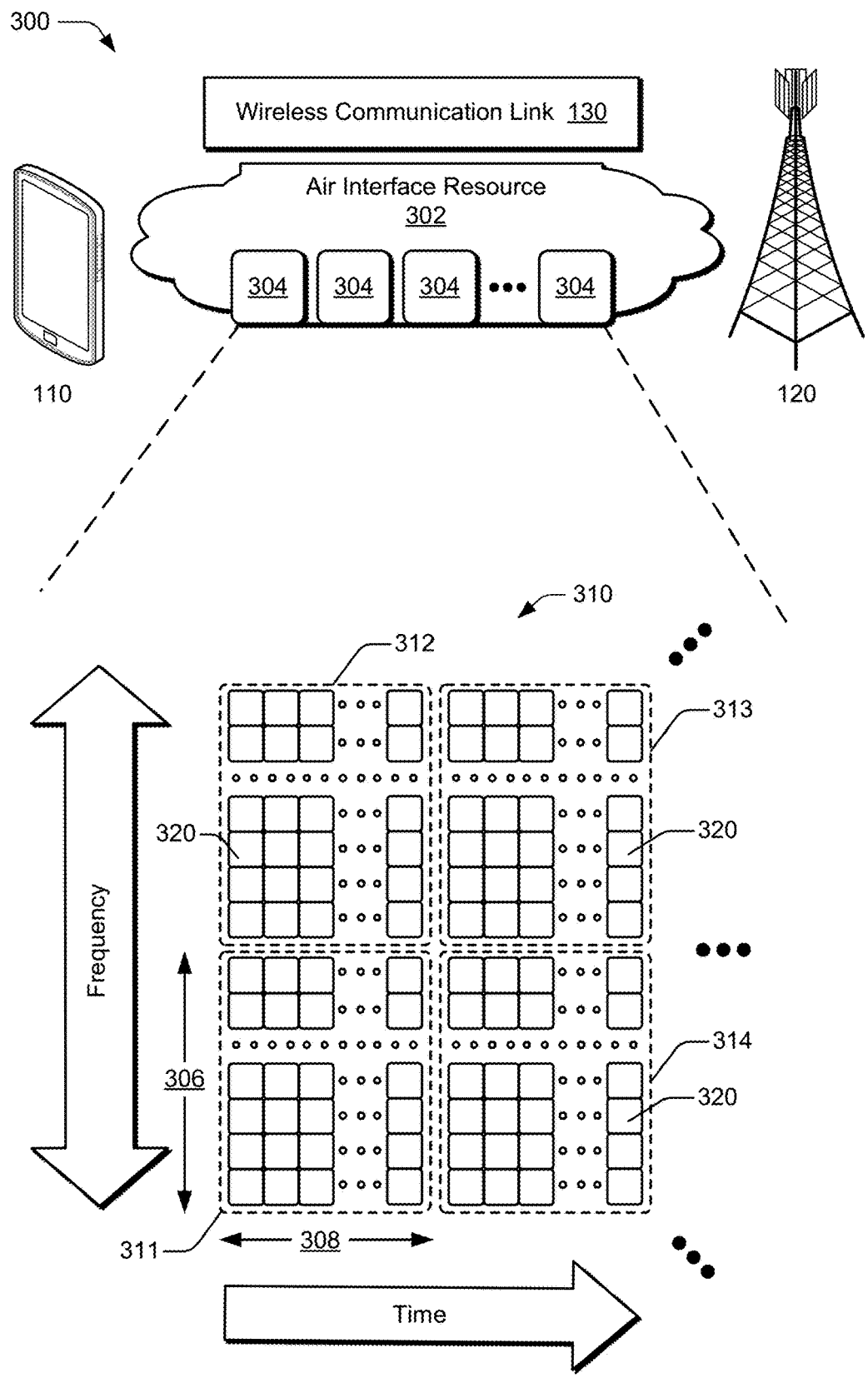
FIG. 3 illustrates an air interface resource that extends between a user equipment and a base station and with which various aspects of an active coordination set for mobility management techniques can be implemented.

FIG. 3 illustrates an air interface resource that extends between a user equipment and a base station and with which various aspects of an active coordination set for mobility management can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The joint communication scheduler 268 (shown in FIG. 2) may determine a respective data-rate, type of information, or amount of information (e.g., data or control information) to be communicated (e.g., transmitted) by the user equipment 110. For example, the joint communication scheduler 268 can determine that each user equipment 110 is to transmit at a different respective data rate or transmit a different respective amount of information. The joint communication scheduler 268 then allocates one or more resource blocks 310 to each user equipment 110 based on the determined data rate or amount of information.

Additionally, or in the alternative to block-level resource grants, the joint communication scheduler 268 may allocate resource units at an element-level. Thus, the joint communication scheduler 268 may allocate one or more resource elements 320 or individual subcarriers to different user equipment 110. By so doing, one resource block 310 can be allocated to facilitate network access for multiple user equipment 110. Accordingly, the joint communication scheduler 268 may allocate, at various granularities, one or up to all subcarriers or resource elements 320 of a resource block 310 to one user equipment 110 or divided across multiple user equipment 110, thereby enabling higher network utilization or increased spectrum efficiency.

The joint communication scheduler 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the joint communication scheduler 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

Active Coordination Set

Figure 4:
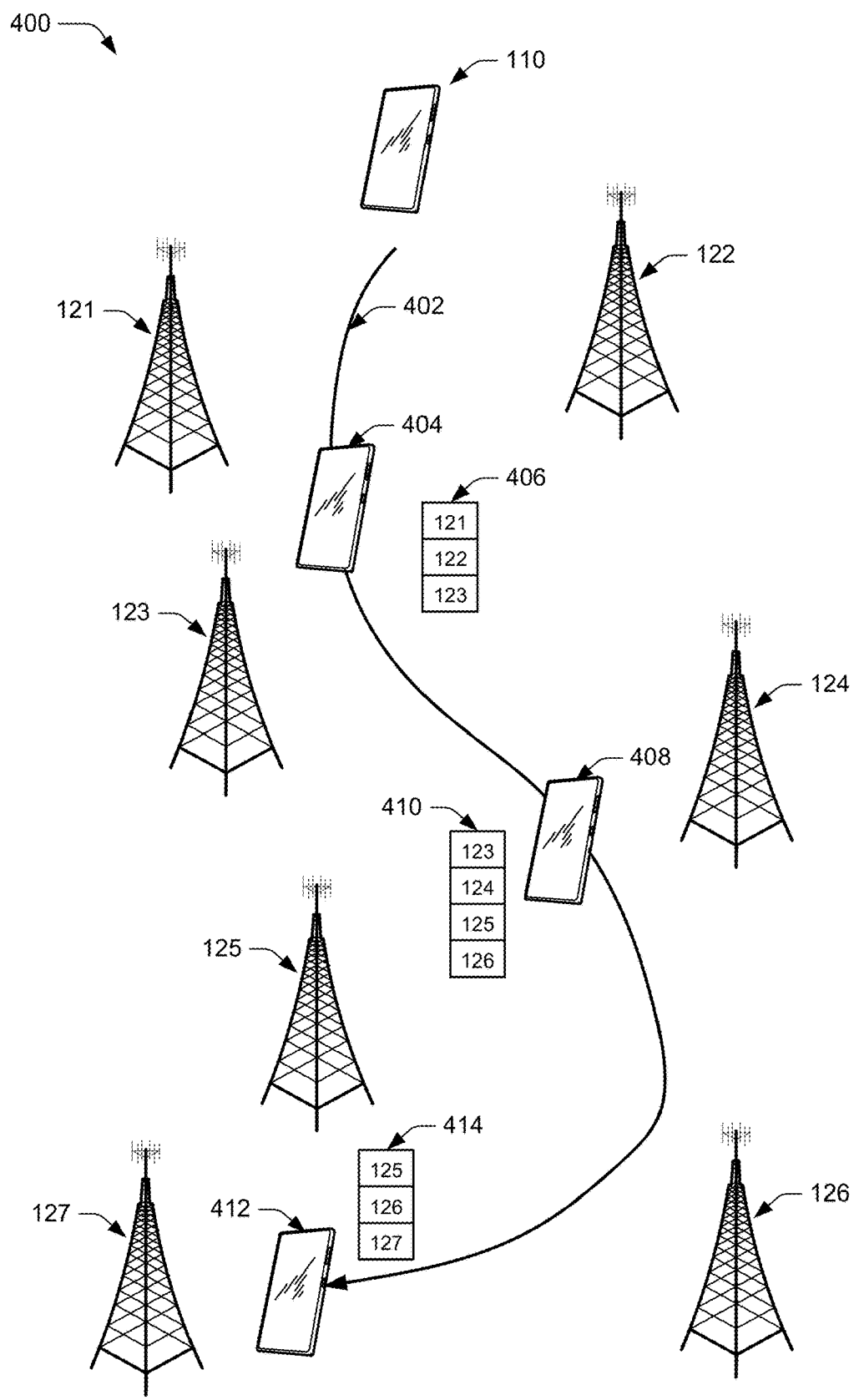
FIG. 4 illustrates an example of a user equipment moving through a radio access network that includes multiple base stations in accordance with aspects of an active coordination set for mobility management techniques.

In aspects, an active coordination set for mobility management is described with which the user equipment 110 measures the link quality of candidate base stations 120 to determine which base stations 120 and associated beam-forming parameters to include in the ACS. FIG. 4 illustrates an example environment 400 in which a user equipment 110 is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands).

For example, the user equipment 110 follows a path 402 through the RAN 140. The user equipment 110 periodically measures the link quality (e.g., of base stations that are currently in the ACS and candidate base stations that the UE 110 may add to the ACS. For example, at position 404, the ACS at 406 includes the base stations 121, 122, and 123. As the UE 110 continues to move, at position 408, the UE 110 has deleted base station 121 and base station 122 from the ACS and added base stations 124, 125, and 126, as shown at 410. Continuing along the path 402, the UE 110, at position 412, has deleted the base stations 123 and 124 and added the base station 127, as shown in the ACS at 414.

Figure 5:
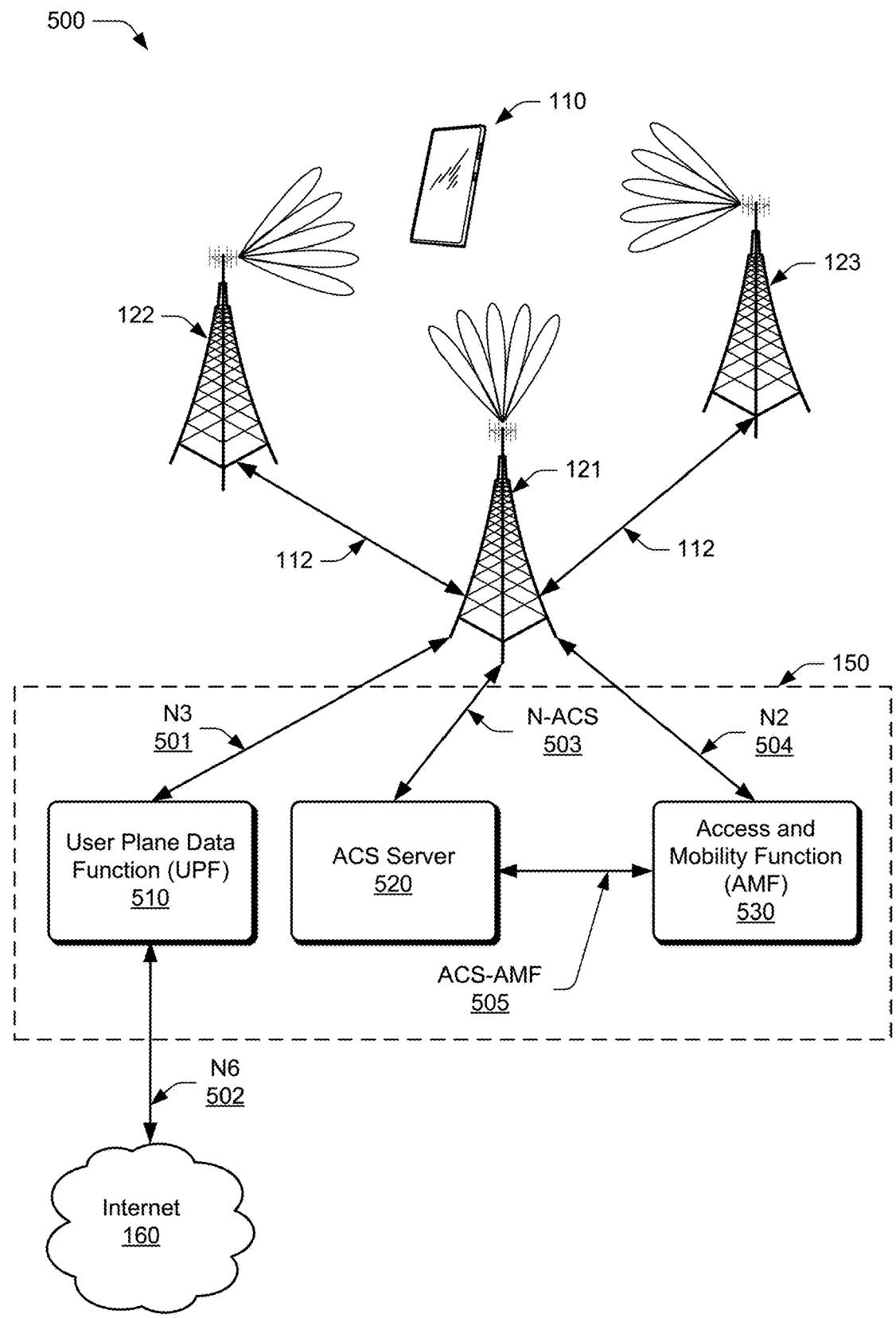
FIG. 5 illustrates an example environment in which various aspects of an active coordination set for mobility management can be implemented.

FIG. 5 illustrates an example environment 500 in which various aspects of an active coordination set for mobility management can be implemented. The user equipment 110 is engaged in joint transmission and/or reception (joint communication) with the three base stations 121, 122, and 123. The base station 121 is acting as a master base station for the joint transmission and/or reception. Which base station is the master base station is transparent to the UE 110, and the master base station can change as base stations are added and/or removed from the ACS. The master base station coordinates control-plane and user-plane communications for the joint communication with the UE 110 via the Xn interfaces 112 (or a similar 6G interface) to the base stations 122 and 123 and maintains the user-plane context between the UE 110 and the core network 150. The coordination may be performed using proprietary or standards-based messaging, procedures, and/or protocols.

The master base station schedules air interface resources for the joint communication for the UE 110 and the base stations 121, 122, and 123, based on the ACS associated with the UE 110. The master base station (base station 121) connects, via an N3 interface 501 (or a 6G equivalent interface), to the User Plane Function 510 (UPF 510) in the core network 150 for the communication of user plane data to and from the user equipment 110. The master base station distributes the user-plane data to all the base stations in the joint communication via the Xn interfaces 112. The UPF 510 is further connected to a data network, such as the Internet 160 via the N6 interface 502.

UE 110 downlink data can be sent from all of the base stations 120 in the ACS or any subset of the base stations 120 in the ACS. The master base station 121 determines which combination of base stations 120 in the ACS to use to transmit downlink data to the UE 110. The selection of base stations 120 to use to transmit downlink data can be based on one or more factors, such as application quality of service (QoS) requirements, location of the UE 110, velocity of the UE 110, a Reference Signal Received Power (RSRP), a Received Signal Strength Indicator (RSSI), interference, or the like. UE 110 uplink data can be received by all of the base stations 120 in the ACS or any subset of the base stations 120 in the ACS.

Similarly to downlink data, the master base station 121 determines which combination of base stations 120 in the ACS to use to receive uplink data from the UE 110. The selection of base stations 120 to use to receive uplink data can be based on one or more factors, such as application QoS requirements, location of the UE 110, velocity of the UE 110, RSRP, RSSI, interference, or the like. Typically, the combination of base stations 120 for downlink transmission and uplink reception will be identical, although different combinations of base stations 120 may be used for downlink transmission and uplink reception.

When the user equipment 110 creates or modifies an ACS, the user equipment 110 communicates the ACS or the ACS modification to an ACS Server 520 that stores the ACS for each user equipment 110 operating in the RAN 140. Although shown in the core network 150, alternatively the ACS Server 520 may be an application server located outside the core network 150. The user equipment 110 communicates the ACS or ACS modification via the master base station (base station 121) which is connected to the ACS Server 520 via an N-ACS interface 503. Optionally or alternatively, the user equipment 110 communicates the ACS or ACS modification to the ACS Server 520 via the Access and Mobility Function 530 (AMF 530) which is connected to the master base station (base station 121) via an N2 interface 504. The AMF 530 relays ACS-related communications to and from the ACS Server 520 via an ACS-AMF interface 505. ACS data between the user equipment 110 and the ACS Server 520 can be communicated via Radio Resource Control (RRC) communications, Non-Access Stratum (NAS) communications, or application-layer communications.

The ACS Server 520 may be implemented as a single network node (e.g., a server). The functionality of the ACS Server 520 may be distributed across multiple network nodes and/or devices and may be distributed in any fashion suitable to perform the functions described herein. The ACS Server 520 includes processor(s) and computer-readable storage media. The processor may be a single core processor, or a multiple core processor composed of a variety of materials, such as silicon, polysilicon, high-K dielectric, copper, and so on. CRM may include any suitable memory or storage device such as random-access memory (RAM), static RAM (SRAM), dynamic RAM (DRAM), non-volatile RAM (NVRAM), read-only memory (ROM), hard disk drives, or Flash memory useful to ACS and related data. The CRM includes applications and/or an operating system of the ACS Server 520 which are executable by the processor(s) to enable communication with the user equipment 110, the master base station 121, and the AMF 530. The ACS Server 520 includes one or more network interfaces for communication with the master base station 121, the AMF 530, and other devices in the core network 150, the user equipment 110, and/or devices in the RAN 140.

Whenever there is a change to the contents of the ACS for any particular user equipment 110, the ACS Server 520 sends a copy of the modified ACS to the master base station (base station 121) for that UE. The copy of the ACS stored in the ACS Server 520, can be considered to be the master copy of the ACS for the UE 110. Optionally, in addition to adding and removing base stations 120 and beamforming weights from the ACS, the UE 110 can query the ACS Server 520, via one or more of the base stations 120, to retrieve a copy of the ACS. The master base station uses the ACS to schedule air interface resources for joint communication with the user equipment 110. For example, when a new base station is added to the ACS or an existing base station in the ACS is deleted, the master base station allocates air interface resources for the new base station to participate in the joint communication or deallocates resources for the deleted base station. The master base station relays user-plane data based on the ACS received from the ACS Server 520. Continuing with the example, the master base station starts routing user-plane data to the new base station added to the ACS or terminates relaying data to the existing base station that was removed from the ACS. If the master base station 121 is removed from the ACS, a different base station 120 is designated as the master base station. This change of master base stations is transparent to the UE 110. For example, when the ACS Server 520 determines that the current master base station is to be removed from the ACS, the ACS Server 520 and/or other core network functions, such as the AMF 530, determines which base station 120 in the updated ACS will be the new master base station. A message indicating the change of the master base station is communicated to the current and new master base stations, which is effective to move the functions of managing communication in the ACS from the current master base station to the new master base station.

In aspects, the initial ACS for the user equipment 110 can be established by the UE 110 during or after the UE 110 performs the attach procedure to connect to the RAN 140. For example, the UE 110 can initialize the ACS with the base stations 120 included in the neighbor relation table of the base station through which the UE 110 attaches to the RAN 140. In another example, the UE 110 considers the base stations 120 included in the neighbor relation table as candidates for the ACS and then measures the link quality of each candidate base station before adding a candidate base station to the ACS. In a further example, the user equipment 110 queries the ACS Server 520 for the last ACS used by the user equipment 110 or an ACS used by this or another UE 110 at the current location of the UE 110. The UE 110 then validates the entries in the last-used ACS to determine which, if any, entries of the last-used ACS are usable for communication and inclusion in the ACS. In another example, the UE 110, measures the link quality of any base stations 120 from the previous ACS that are within communication range and populates the ACS with one or more of the base stations 120 that exceed a threshold for inclusion (e.g., above a threshold for a Received Signal Strength Indicator (RSSI), a Reference Signal Received Power (RSRP), or a Reference Signal Received Quality (RSRQ)).

The user equipment 110 adds or deletes a base station 120 from the ACS by sending an ACS modification message to the ACS Server 520. The ACS modification message includes an identifier for a base station to add or delete from the ACS along with an indicator to either add or delete the identified base station. When adding a base station to the ACS, the ACS modification message can also include beamforming parameters for the base station being added. Optionally, or additionally, the ACS modification message may include identifiers of multiple base stations with corresponding add/delete indicators for each base station. Other information useful to the management of the ACS may be stored in or with the ACS, such as timestamps for entries in the ACS, geographic location information from the UE, an identifier for the UE 110, identification information for the current master base stations, and the like.

The ACS Server 520 receives the ACS modification message from the UE 110 (via the current master base station) and performs the requested modification to an ACS record for the UE 110 that is stored by the ACS server 520. After receiving the ACS modification message, the ACS Server 520 sends a modified copy of the ACS for the UE 110 to the master base station (base station 121) via the N-ACS interface 503. Optionally or alternatively, the ACS Server 520 may send only the modification of the ACS to the master base station which causes the master base station to update its copy of the ACS. The joint communication scheduler 268 in the master base station uses the updated or modified ACS to modify the scheduling of resources and joint communications for the base stations 120 in the ACS. The master base station can perform real-time scheduling of resources within the ACS of the user equipment 110 to respond to changing channel conditions or communication requirements with low latency requirements.

Figure 6A:
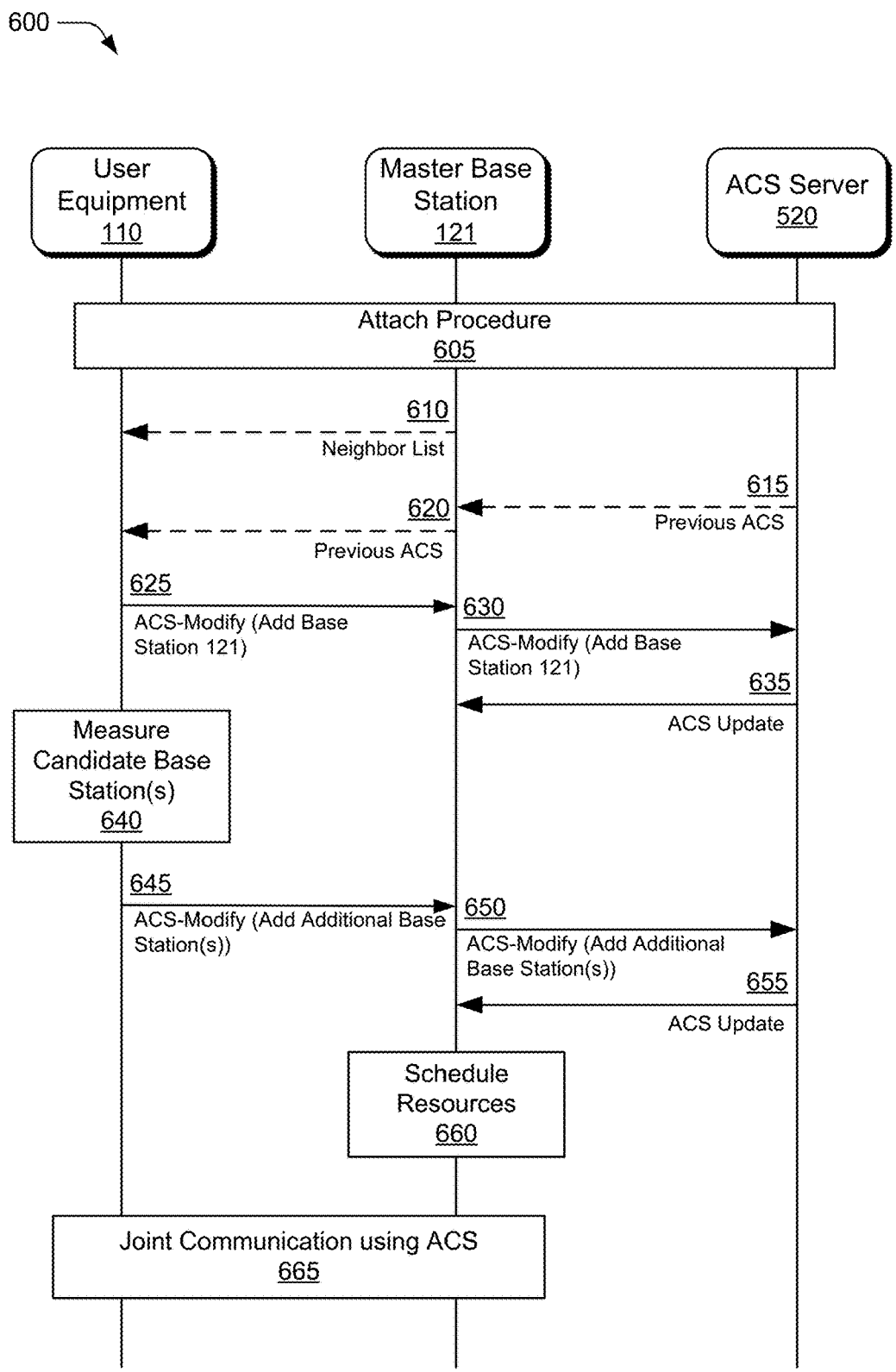
FIGS. 6a and 6b illustrate an example of data and control transactions between devices in accordance with aspects of an active coordination set for mobility management techniques.
Figure 6B:
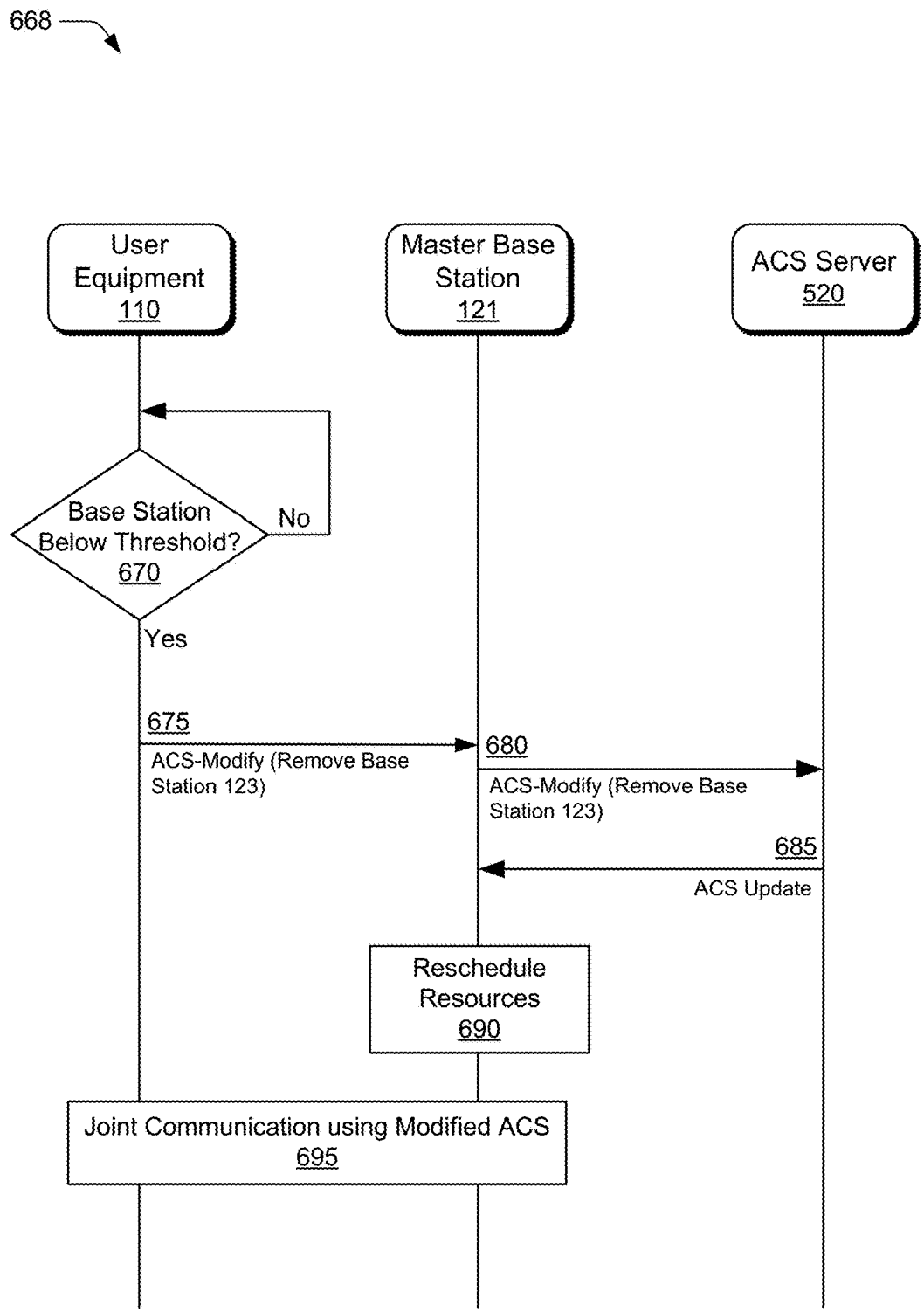

FIGS. 6a and 6b illustrate an example of control transactions 600 and 668 between devices in accordance with aspects of an active coordination set for mobility management. The user equipment 110 attaches to the RAN 140 by performing an attach procedure at 605. In one alternative, the UE 110 may receive a System Information Block (SIB) that includes information describing neighboring base stations (e.g., SIB3 or SIB4). In this alternative, the UE 110 can use the neighboring base stations as candidate base stations to include in the ACS or to further evaluate for inclusion in the ACS. Optionally or alternatively, at 610, the master base station 121 may transmit a list of neighboring base stations to the UE 110 specifically for the purpose of providing the UE 110 with candidate base stations for potential inclusion in the ACS.

Optionally or alternatively, the UE 110 may use a previous ACS (e.g., the last ACS used by the UE 110 before detaching from the RAN 140 or an ACS used by this or another UE 110 at or near the current geographic location of the UE 110) as a list of candidate base stations for the ACS or as an initial ACS. For example, based on the base station identifiers included in the ACS or based on optional geographic location information stored with the ACS of the UE's last location before detaching from the RAN 140, the UE 110 can use, or evaluate for use, the previous ACS as the current ACS or the ACS of another UE used at the current geographic location of the UE 110. In this example, the ACS Server 520 sends the previous ACS to the master base station 121 at 615, which the master base station 121 forwards to the UE 110 at 620. The ACS Server 520 may be triggered to send the previous ACS by the attach process, such as by receiving a message from the AMF 530, or the UE 110 may message the ACS Server 520 to request the previous ACS.

At 625, the user equipment 110 sends an ACS-Modify message to the master base station 121 to add the base station 121 to the ACS, which the master base station 121 relays to the ACS Server 520 at 630. The ACS Server 520 updates the copy of the ACS stored by the ACS Server 520 to add the master base station 121 to the ACS associated with the UE 110. If there is no copy of an ACS associated with the UE 110 stored in the ACS Server 520, the ACS Server 520 creates an ACS for the UE 110, associates the ACS with the UE 110, and adds the master base station 121, to the ACS associated with the UE 110, as the initial master base station for the ACS. Based on receiving the ACS-Modify message, the ACS Server 520 sends, at 635, an updated ACS to the master base station 121. The master base station 121 uses the copy of the updated ACS to allocate resources and schedule communications between the UE 110 and any base stations 120 included in the ACS.

At 640, the UE 110 measures the link quality (e.g., RSRP) of candidate base stations for inclusion in the ACS. The measurement of link quality can include performing a beam search or beam scan procedure to determine the link quality of beams transmitted by the candidate base stations. The UE 110 may identify candidate base stations in any suitable manner, such as from a received neighboring base station list, a previous ACS, by listening for broadcast transmission within the RAN 140, performing a frequency search, from a neighbor advertisement, and so forth.

Based on the performed measurements, the UE 110 identifies one or more additional base stations 120 to add to the ACS. At 645, the UE 110 sends another ACS-Modify message including identifiers of the additional base stations 120 to the master base station 121. The identifiers of the additional base stations can include associated beamforming parameters for each of the additional base stations. The master base station relays the ACS-Modify message to the ACS Server 520, at 650. The ACS Server 520 updates the stored ACS of the UE 110 to include the identifiers of the additional base stations 120 and at 655 sends an updated version of the ACS to the master base station 121.

At 660, based on receiving the updated ACS, the master base station 121 schedules resources for joint communication with the UE 110 by one or more of the base stations 120 in the ACS. The master base station 121 communicates the resource schedule via the Xn interfaces 112 between the master base station 121 and the additional base stations 120 to enable joint communication with the UE at 665.

Continuing at 670 in FIG. 6b, the user equipment 110 evaluates whether any base station 120 in the ACS has fallen below a threshold for link quality (e.g., a threshold value for a minimum RSRP level). For example, the UE 110 may evaluate the base stations 120 periodically in time using either a standard time period or a dynamically changing time period, based on communication performance metrics (e.g., dropped frame rate, retransmission rate, or the like), based on a change in the location of the UE 110 exceeding a distance threshold or a velocity threshold, or the like.

If the UE 110 determines that a base station has fallen below the link quality threshold, the UE 110 removes that base station from the ACS. For example, the UE 110 determines that the base station 123 has fallen below the link quality threshold and sends, at 675, an ACS-Modify message to remove the base station 123 from the ACS. The master base station 121 and/or other base stations in the ACS receive the ACS-Modify message, and the master base station 121 forwards the ACS-Modify message to the ACS Server 520 at 680. The ACS Server 520 modifies the ACS, stores the modified ACS, and at 685 sends the modified ACS to the master base station 121. Optionally or additionally, the ACS-Modify message can indicate a change in beamforming parameters for a base station already included in the ACS. For example, the ACS-Modify message can indicate adding a base station that is already included in the ACS but with new beamforming parameters or the ACS-Modify message can indicate an update to the beamforming parameters of the base station in the ACS.

At 690, the master base station 121 modifies the resource allocations and scheduling based on the modified ACS and communicates the modified schedule to the base stations in the modified ACS and communicates the deallocation of scheduled resources to the base station 123 that has been removed from the ACS. At 695, the master base station 121 and the base stations 120 in the modified ACS continue joint communication with the UE.

ACS Uplink Sounding

As described above, the user equipment 110 can determine which base stations 120 to include in the ACS based on the measurement of radio frequency (RF) signals transmitted from the candidate base stations. In another aspect, the user equipment can evaluate candidate base stations 120 by transmitting an uplink sounding signal to measure uplink performance. The uplink sounding may be used in place of, or in addition to, downlink measurements when the UE 110 determines which base stations 120 to include in the ACS. For example, uplink sounding may be used for a Time Division Duplex (TDD) radio link due to the link reciprocity in a TDD radio channel; however, uplink sounding may be applied in Frequency Division Duplex (FDD) systems as well.

Figure 7:
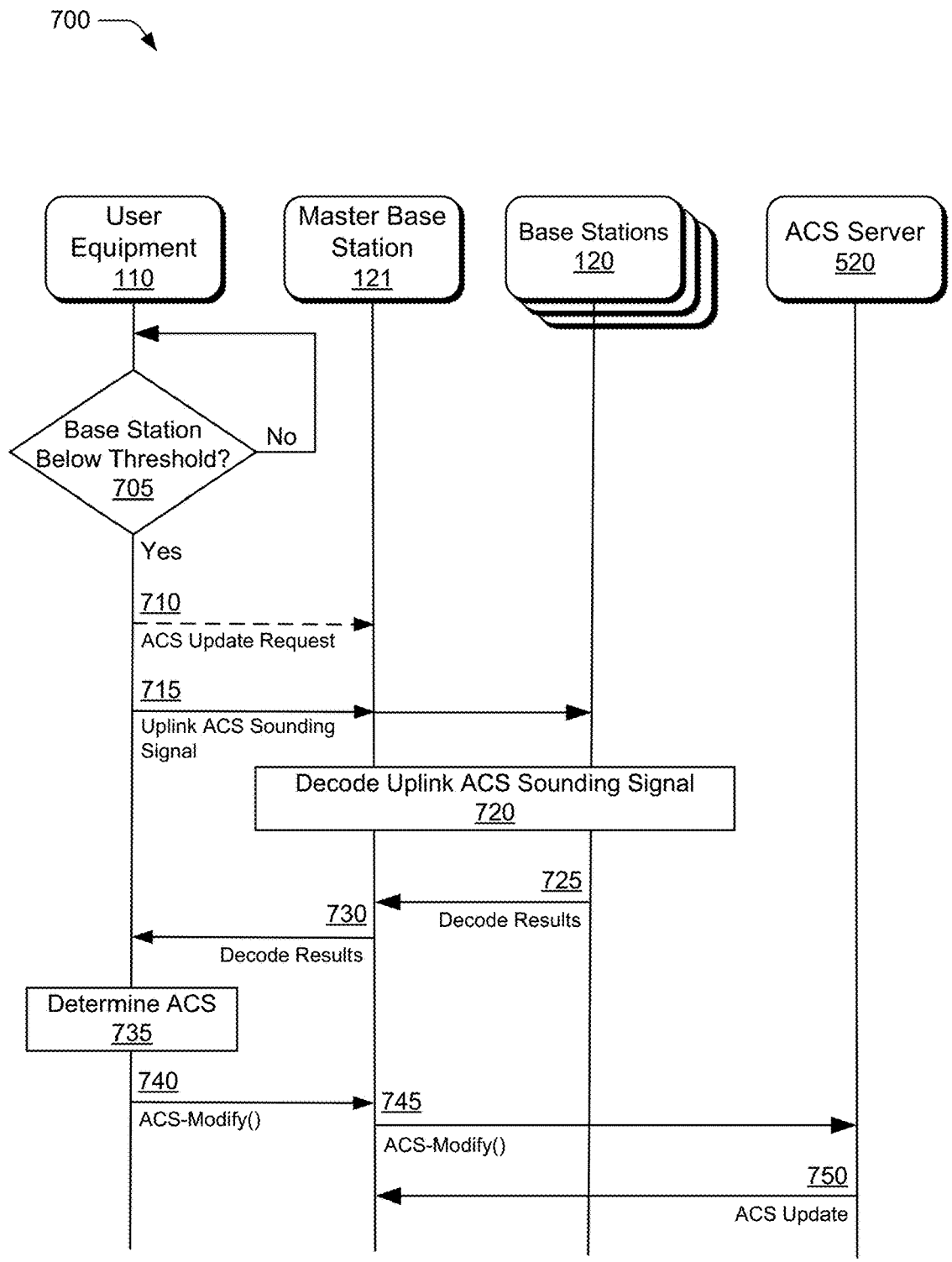
FIG. 7 illustrates an additional example of data and control transactions between devices in accordance with aspects of an active coordination set for mobility management techniques.

FIG. 7 illustrates an example of control transactions 700 between devices in accordance with aspects of an active coordination set for mobility management that generally relate to uplink sounding. At 705, the user equipment 110 evaluates whether any base station 120 in the ACS has fallen below a threshold for link quality (e.g., a threshold value for a minimum RSRP level).

Optionally at 710, the user equipment 110 sends an ACS Update Request or another signal such as a Random Access Channel (RACH) signal to the master base station 121 and/or other base stations 120 in the ACS indicting that the user equipment 110 will be transmitting an uplink ACS sounding signal. Time, frequency, and code resources for the uplink ACS sounding signal can be semi-statically allocated in the RAN 140. Optionally or additionally, the master base station 121 notifies candidate base stations 120 (that may not be included in the ACS currently being used by the UE 110) that the UE 110 will be transmitting an uplink ACS sounding signal. An indication of the time, frequency, and code resources for the uplink ACS sounding signal may be included in the notification.

At 715, the user equipment 110 transmits the uplink ACS sounding signal to the master base station 121 and other base stations 120 in the ACS. At 720, the master base station 121 and other base stations 120 in the ACS decode the uplink ACS sounding signal and report link quality metrics (e.g., RSSI) for the decoded uplink ACS sounding signal. The base stations 120 report the decode results to the master base station 121 at 725, and the master base station 121 forwards those decode results along with its own decode result to the UE 110 at 730.

At 735, the user equipment 110 evaluates the received decode results and determines which base stations 120 to include in the ACS. Optionally or alternatively, the master base station 121 can evaluate the decode results and determine which base stations 120 to include in the ACS and communicate a new ACS or changes in the ACS to the UE 110 and the ACS Server 520. In another option or alternative, the decode results can be forwarded to the ACS Server 520 for the evaluation and determination of which base stations 120 to include in the ACS and the ACS Server 520 communicates a new ACS or changes in the ACS to the UE 110 and the master base station 121. Optionally or additionally, other uplink and/or downlink signals, such as a Physical Uplink Shared Channel (PUSCH), a Physical Uplink Control Channel (PUCCH), or a Physical Random Access Channel (PRACH) can be evaluated to determines which base stations 120 to include in an ACS.

At 740, the user equipment 110 sends an ACS-Modify message to the master base station 121 indicting which base stations 120 to add to and/or remove from the ACS. The UE 110 may also choose to remove from the ACS one or more base stations 120 that did not return a decode result. At 745, the master base station 121 forwards the ACS-Modify message to the ACS Server 520. The ACS Server 520 modifies the ACS, stores the modified ACS, and at 750 sends the modified ACS to the master base station 121.

Example Methods

Example methods 800 and 900 are described with reference to FIGS. 8 and 9 in accordance with one or more aspects of an active coordination set for mobility management. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
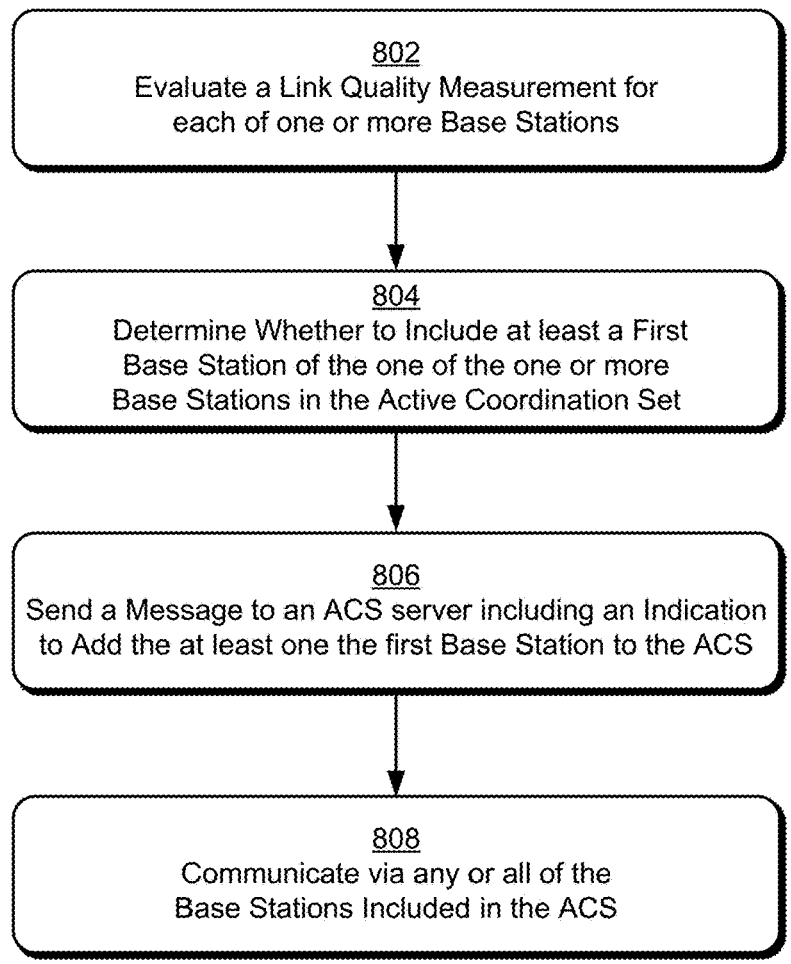
FIG. 8 illustrates an example method of an active coordination set for mobility management as generally related to the user equipment determining base stations for inclusion in the ACS in accordance with aspects of the techniques described herein.

FIG. 8 illustrates example method(s) 800 of an active coordination set for mobility management as generally related to the user equipment 110 determining base stations 120 for inclusion in the ACS. At block 802, a user equipment (e.g., the user equipment 110) evaluates a link quality measurement for each of one or more base stations (e.g., the base stations 120). For example, the user equipment evaluates a link quality parameter, such as RSRP, for downlink RF signals received from each of the one or more base stations.

At block 804, the user equipment determines whether to include at least a first base station of the one or more base stations in the ACS. For example, the user equipment compares the received downlink RF signals to a threshold for a minimum acceptable value for the link quality parameter.

At block 806, the user equipment sends a message to an ACS Server (e.g., the ACS Server 520) including an indication to add the at least first base station to the ACS. For example, the user equipment sends an ACS-Modify message to the ACS Server that causes the ACS Server to store the ACS for the user equipment that includes the indicated base station(s) and sends a copy of the stored ACS to a master base station (e.g., the master base station 121).

At block 808, the user equipment communicates via one or more of the base stations included in the ACS. For example, the user equipment communicates via wireless channels with one, two, or more of the base stations included in the ACS.

Figure 9:
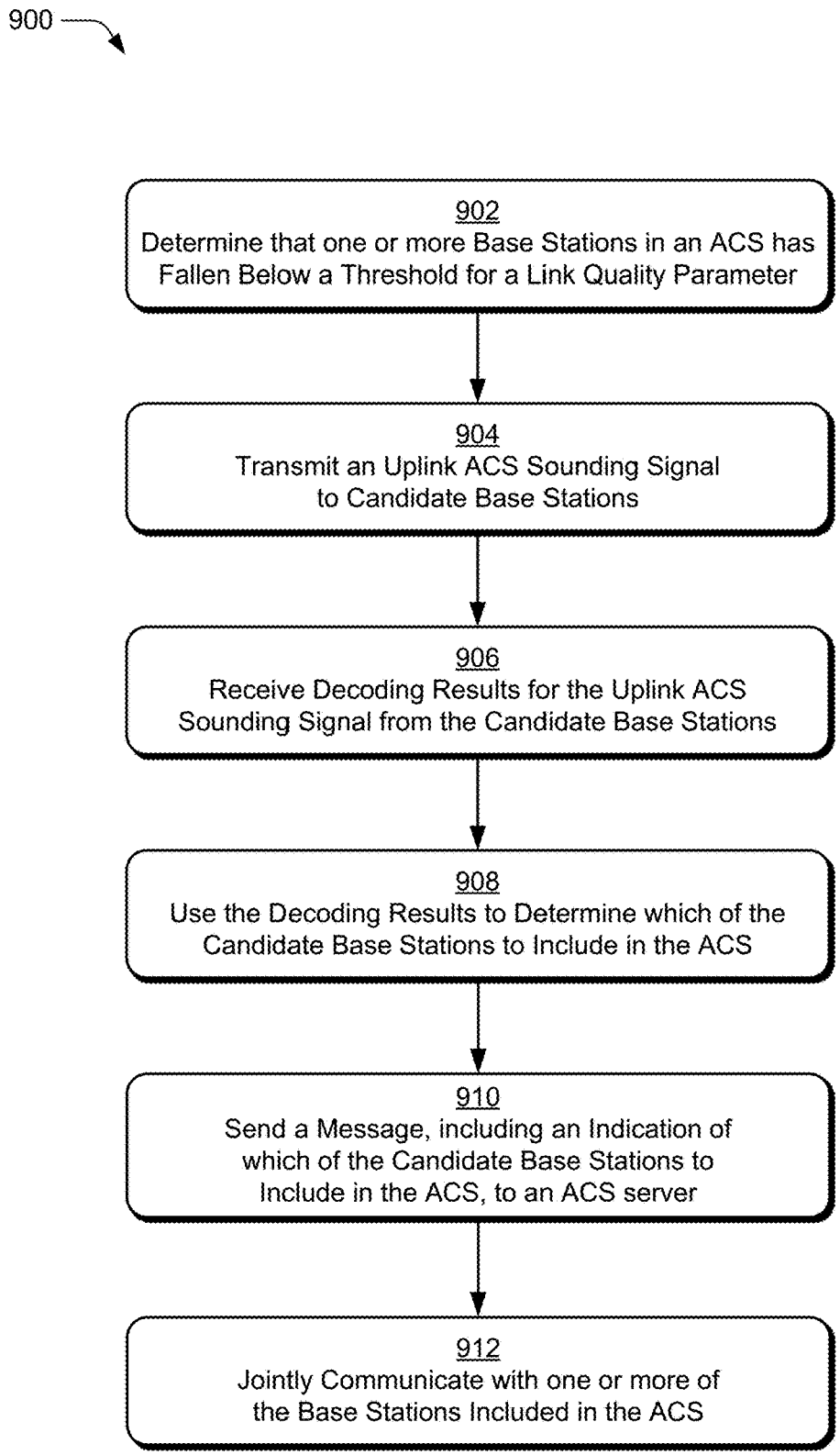
FIG. 9 illustrates an example method of an active coordination set for mobility management as generally related to the user equipment maintaining an ACS by evaluating candidate base stations to include in the ACS in accordance with aspects of the techniques described herein.

FIG. 9 illustrates example method(s) 900 of an active coordination set for mobility management as generally related to the user equipment 110 maintaining an ACS by evaluating candidate base stations to include in the ACS. At block 902, the user equipment (e.g., the user equipment 110) determines that one or more base stations (e.g., the base stations 120) in the ACS has fallen below a threshold for a link quality parameter. For example, the user equipment determines that a downlink quality parameter has dropped below a threshold for a minimum acceptable value for the link quality parameter.

At block 904, the user equipment transmits an uplink ACS sounding signal to candidate base stations. For example, the user equipment transmits the uplink ACS using semi-statically allocated resources for the uplink ACS sounding signal to candidate base stations that receive and decode the uplink ACS sounding signal.

At block 906, the user equipment receives decoding results for the uplink ACS sounding signal from the candidate base stations. For example, the candidate base stations transmit the decoding results directly to the user equipment or send the decoding results to the master base station (e.g., the master base station 121) via the Xn interface 112 which then passes on the set of decoding results to the UE wirelessly.

At block 908, the user equipment uses the decoding results to determine which of the candidate base stations to include in the ACS. For example, the user equipment adds one or more of the candidate base stations to the ACS that reported a decoding result greater than a threshold value for decoding results. As another example, the UE removes one or more of the candidate base stations from the ACS that reported a decoding result lower than a threshold value or did not report any decoding results.

At block 910, the user equipment sends a message to an ACS Server that includes an indication of which of the candidate base stations to include in the ACS. For example, the user equipment sends an ACS-Modify message to the ACS Server that causes the ACS Server to store the ACS, for the user equipment, that includes the indication of the base stations to include and/or remove from the ACS and sends a copy of the ACS to the master base station. The copy of the ACS stored in the ACS Server 520 can be considered to be the master copy of the ACS. In alternatives, the copy of the ACS stored in the UE 110 or stored in the master base station 121 can be considered to be the master copy of the ACS.

At block 912, the user equipment jointly communicates with one or more of the base stations included in the ACS. For example, the user equipment uses joint reception to receive communications from the base stations included in the ACS and/or uses joint transmission to transmit communications to the base stations included in the ACS.

Although aspects of an active coordination set for mobility management have been described in language specific to features and/or methods, the subject of the appended claims is not necessarily limited to the specific features or methods described. Rather, the specific features and methods are disclosed as example implementations of the active coordination set for mobility management, and other equivalent features and methods are intended to be within the scope of the appended claims. Further, various different aspects are described, and it is to be appreciated that each described aspect can be implemented independently or in connection with one or more other described aspects.

What is claimed is:

1. A method for determining an Active Coordination Set (ACS) by a user equipment (UE) for wireless communication between the user equipment and one or more base stations, the method comprising:
    evaluating, by the user equipment, a measurement of a link quality parameter for each of the one or more base stations;
    determining to include at least a first base station of the one or more base stations in the ACS;
    sending a message to an ACS Server including an indication to add the at least the first base station to the ACS, the message being effective to cause the ACS Server to:
        store the ACS for the user equipment, the stored ACS including the indication of the at least the first base station; and
        send a copy of the stored ACS to a master base station;
    communicating, by the user equipment, via one or more of the base stations included in the ACS;
    determining, by the user equipment, that one or more of the base stations in the ACS has fallen below a threshold for the link quality parameter;
    transmitting an uplink ACS sounding signal that is effective to cause candidate base stations to receive and decode the uplink ACS sounding signal;
    receiving decoding results for the uplink ACS sounding signal from the candidate base stations;
    determining, using the decoding results, which of the candidate base stations to include in the ACS;
    sending a message to the ACS Server including an indication of which candidate base stations to include in the ACS; and
    jointly communicating with one or more of the base stations included in the ACS.

2. The method of claim 1, wherein the communicating, by the user equipment, comprises:
    jointly receiving, by the user equipment, downlink user-plane data from more than one of the base stations included in the ACS;
    jointly transmitting, by the user equipment, uplink user-plane data to more than one of the base stations included in the ACS; or
    both the jointly receiving the downlink user-plane data and the jointly transmitting the uplink user-plane data.

3. The method of claim 1, wherein the evaluating, by the user equipment, comprises:
 receiving, by the user equipment, downlink radio frequency (RF) signals from each of the one or more base stations;
 measuring the link quality parameter of each of the downlink RF signals; and
 comparing each of the measured link quality parameters to a minimum link quality threshold.

4. The method of claim 3, wherein the determining comprises:
 determining to add to the ACS any of the one or more base stations with a measured link quality parameter that exceeds the minimum link quality threshold.

5. The method of claim 1 further comprising:
 determining, by the user equipment, that a base station in the ACS is below a minimum link quality threshold;
 sending another message to the ACS Server including an indication to delete from the ACS the base station that is below the minimum link quality threshold, the sending being effective to cause the ACS Server to:
  update the stored copy of the ACS to remove the indicated base station from the ACS;
  store the updated copy of the ACS; and
  send the updated copy of the ACS to the master base station.

6. The method of claim 1, wherein the sending a message to the ACS Server comprises:
 sending the message using a Radio Resource Control (RRC) communication, a Non-Access Stratum (NAS) communication, or an application-layer communication.

7. The method of claim 1, comprising:
 sending, by the user equipment, an ACS update request to the master base station before transmitting the uplink ACS sounding signal.

8. The method of claim 1, wherein air interface resources for transmitting the uplink ACS sounding signal are semi-statically allocated.

9. The method of claim 1, wherein the determining, by the user equipment, that one or more of the base stations in the ACS has fallen below the threshold for the link quality parameter comprises:
 measuring the link quality parameter for a downlink radio frequency (RF) signal from each of the one or more base stations; and
 comparing each of the measured link quality parameters to a minimum link quality threshold.

10. The method of claim 1, wherein the determining, using the decoding results, which of the candidate base stations to include in the ACS comprises:
 adding one or more of the candidate base stations to the ACS, the one or more of the candidate base stations each reporting a decoding result greater than a threshold value for the decoding result; or
 removing one or more base stations, previously included in the ACS before the transmitting the uplink ACS sounding signal, that reported a decoding result below the threshold value for the decoding result or failed to report a decoding result; or
 both the adding one or more of the candidate base stations to the ACS and the removing one or more base stations previously included in the ACS.

11. A user equipment (UE) comprising:
 one or more radio frequency (RF) transceivers;
 a processor and memory system to implement an active coordination set (ACS) manager application configured to:
  evaluate a measurement of a link quality parameter for one or more base stations;
  determine to include at least a first base station of the one or more base stations in an ACS;
  send, using the one or more RF transceivers, a message to an ACS Server, the message including an indication to add the at least the first base station to the ACS, the message causing the ACS Server to:
   store the ACS for the user equipment, the stored ACS including the indication of the at least the first base station; and
   send a copy of the stored ACS to a master base station;
  store the ACS including the added at least the first base station;
  communicate, using the one or more RF transceivers, via one or more of the base stations included in the ACS;
  determine that one or more of the base stations in the ACS has fallen below a threshold for the link quality parameter;
  transmit an uplink ACS sounding signal that is effective to cause candidate base stations to receive and decode the uplink ACS sounding signal;
  receive decoding results for the uplink ACS sounding signal from the candidate base stations;
  determine, using the decoding results, which of the candidate base stations to include in the ACS;
  send a message to the ACS Server including an indication of which candidate base stations to include in the ACS; and
  jointly communicate with one or more of the base stations included in the ACS.

12. The user equipment of claim 11, wherein the active coordination set (ACS) manager application is configured to:
 receive, using the one or more RF transceivers, downlink radio frequency (RF) signals from each of the one or more base stations;
 measure the link quality parameter of each of the downlink RF signals;
 compare each of the measured link quality parameters to a minimum link quality threshold; and
 determine to add any of the one or more base stations with a measured link quality measurement that exceeds the minimum link quality threshold to the ACS.

13. The user equipment of claim 11, wherein the communication comprises one or more of:
 joint reception of downlink user-plane data from more than one of the base stations included in the ACS;
 joint transmission of uplink user-plane data to more than one of the base stations included in the ACS; or
 both the joint reception of downlink user-plane data and the joint transmission of uplink user-plane data.

14. The user equipment of claim 11, wherein the active coordination set (ACS) manager application is configured to:
 determine that a base station in the ACS is below a minimum link quality threshold;
 delete the base station that is below the minimum link quality threshold from the ACS stored in the UE;
 send another message to the ACS Server, the other message including an indication to delete the base station that is below the minimum link quality threshold from the ACS, the other message causing the ACS Server to:
  update the stored copy of the ACS to remove the base station from the ACS;
  store the updated copy of the ACS; and
  send the updated copy of the ACS to the master base station.

15. An Active Coordination Set (ACS) Server device comprising:
  a network interface;
  one or more processors; and
  memory comprising instructions executable by the one or more processors to configure the ACS Server device to:
    receive, using the network interface and via a master base station, an ACS-Modify message from a user equipment (UE);
    retrieve, from the memory, a stored copy of an ACS associated with the UE;
    modify the retrieved copy of the ACS based on the received ACS-Modify message;
    store the modified copy of the ACS in the memory;
    if there is no stored copy of the ACS associated with the UE:
      create an ACS for the UE;
      modify the created ACS based on the received ACS-Modify message; and
      store the modified ACS in the memory; and
    send, using the network interface, a copy of the modified ACS to the master base station that is effective to cause the master base station to allocate air interface resources for communication between the UE and base stations in the ACS and schedule joint communications for the UE and the base stations in the ACS.

16. The ACS Server device of claim 15, wherein the received ACS-Modify message comprises an indication to add one or more base stations to the ACS, and wherein the modification of the retrieved copy of the ACS comprises adding the indicated one or more base stations to the retrieved copy of the ACS.

17. The ACS Server device of claim 15, wherein the received ACS-Modify message comprises an indication to remove one or more base stations from the ACS, and wherein the modification of the retrieved copy of the ACS comprises removing the indicated one or more base stations from the retrieved copy of the ACS.

18. The ACS Server device of claim 15, the instructions executable by the one or more processors to configure the ACS server device to:
  receive, using the network interface, a query for the ACS associated with the UE;
  retrieve, from the memory, the stored copy of the ACS associated with the UE; and
  send the stored copy of the ACS to the UE, via the master base station.

19. The user equipment of claim 11, wherein the active coordination set (ACS) manager application is configured to:
  send the message to the ACS Server using a Radio Resource Control (RRC) communication, a Non-Access Stratum (NAS) communication, or an application-layer communication.

20. An Active Coordination Set (ACS) Server device comprising:
  a network interface;
  one or more processors; and
  memory comprising instructions executable by the one or more processors to configure the ACS Server device to:
    receive, using the network interface and via a master base station, an ACS-Modify message from a user equipment (UE);
    receive, using the network interface, a query for an ACS associated with the UE;
    retrieve, from the memory, a stored copy of the ACS associated with the UE;
    modify the retrieved copy of the ACS based on the received ACS-Modify message;
    store the modified copy of the ACS in the memory;
    send the stored copy of the ACS to the UE, via the master base station; and
    send, using the network interface, the stored copy of the ACS to the master base station that is effective to cause the master base station to allocate air interface resources for communication between the UE and base stations in the ACS and schedule joint communications for the UE and base stations in the ACS.

* * * * *